United States Patent
Thoms

[19]
[11] Patent Number: 6,092,287
[45] Date of Patent: Jul. 25, 2000

[54] RIGID CONNECTION OF STRUCTURAL PARTS IN THE CASE OF A MOTOR VEHICLE AND METHOD FOR ESTABLISHING THE CONNECTION

[75] Inventor: Volker Thoms, Calw, Germany

[73] Assignee: DaimlerChrysler AG, Stuttgart, Germany

[21] Appl. No.: 09/185,715

[22] Filed: Nov. 4, 1998

Related U.S. Application Data

[62] Division of application No. 08/758,936, Dec. 3, 1996, Pat. No. 5,879,099.

[30] Foreign Application Priority Data

Dec. 22, 1995 [DE] Germany ............................ 195 48 341

[51] Int. Cl.[7] .............................. B21D 47/00; B21D 39/00
[52] U.S. Cl. ........................ 29/897.2; 29/421.1; 29/455.1; 29/523
[58] Field of Search .................................. 29/421.1, 523, 29/455.1, 897.2, 897.312, 890.036, 890.044; 72/54

[56] References Cited

U.S. PATENT DOCUMENTS

| | | |
|---|---|---|
| 605,195 | 6/1898 | Birtwisle . |
| 786,551 | 4/1905 | Doolittle ................................... 29/523 |
| 1,709,865 | 4/1929 | Muffly ..................................... 29/421.1 |
| 2,259,433 | 10/1941 | Kitto .................................. 29/890.036 |
| 2,770,874 | 11/1956 | Lindow . |
| 2,779,279 | 1/1957 | Maiwurm . |
| 2,850,796 | 9/1958 | Kaplowitz et al. . |
| 2,861,530 | 11/1958 | Macha . |
| 3,104,735 | 9/1963 | Ludlow et al. .......................... 29/455.1 |
| 3,206,845 | 9/1965 | Crump ....................................... 29/523 |
| 3,243,248 | 3/1966 | Silverman et al. ...................... 351/113 |

(List continued on next page.)

FOREIGN PATENT DOCUMENTS 2345243 10/1977 France .
108559 3/1898 Germany .
2122350 11/1972 Germany ............................... 403/297
3306397A1 2/1984 Germany .
3008840C2 8/1987 Germany .

(List continued on next page.)

OTHER PUBLICATIONS

Search Report Apr. 23, 1997 Europe.

*Primary Examiner*—David P. Bryant
*Attorney, Agent, or Firm*—Evenson, McKeown, Edwards & Lenahan, P.L.L.C.

[57] ABSTRACT

A rigid connection of structural parts of a motor vehicle and a tool and for establishing the connection are provided. The structural parts are fixed together after a coating during their assembly to one another in a simple, joined and effective manner without plastically deforming the respective exterior structural part and damaging the coating in the process and therefore visually impairing the visible side of the structural parts. The two structural parts to be connected are designed as oblong hollow bodies with one structural part having axially spaced radial cross-sectional reductions along the length of the connection in which the other structural part is held on it while forming a releasable plug-type connection and in that the first structural part—starting from the plug-in position. Because of the expansion between the plug-type connection points, during an internal high-pressure deforming, the parts are locked in a form-fitting manner. The interim structural part, in contrast to the other structural part, being constructed to be more easily plastically deformable under high pressure. A tool used for the deforming is constructed as an oblong, radially expandable, elastic, hollow swelling body which is closed on all sides in a pressure-tight manner, has a pressure connection extending to the outside and connected with a high-pressure fluid line, and is provided with a tension device hindering axial expansions of the swelling body. The tool, in a flexible condition subjected to a fluid pressure, is introduced into the interior structural part in it plug-in position and plastically widens the interior structural part under a higher pressure until a locking form-fitting of the two structural parts occurs.

3 Claims, 1 Drawing Sheet

U.S. PATENT DOCUMENTS

| | | |
|---|---|---|
| 3,255,090 | 6/1966 | Leirvik ................................... 29/455.1 |
| 3,259,206 | 7/1966 | Straw ................................... 29/890.08 |
| 3,432,916 | 3/1969 | Fisher et al. . |
| 3,724,153 | 4/1973 | Wessells, III et al. . |
| 4,575,913 | 3/1986 | Sugiuchi et al. ........................... 29/523 |
| 4,648,626 | 3/1987 | Vinciguerra et al. ..................... 29/523 |
| 4,875,270 | 10/1989 | Krips et al. . |
| 4,882,825 | 11/1989 | Nakamura . |
| 4,940,356 | 7/1990 | Hashimoto et al. ................ 403/297 X |
| 4,958,953 | 9/1990 | Charondiere ........................... 403/5 X |
| 5,061,000 | 10/1991 | Haugen et al. .................... 403/297 X |
| 5,101,554 | 4/1992 | Breuer et al. . |
| 5,253,947 | 10/1993 | Petrzelka et al. ....................... 403/274 |
| 5,404,630 | 4/1995 | Wu . |
| 5,629,823 | 5/1997 | Mizuta ................................. 403/297 X |
| 5,688,066 | 11/1997 | Loose ..................................... 403/297 |
| 5,704,752 | 1/1998 | Legerot .............................. 403/279 X |
| 5,752,311 | 5/1998 | Snyder .............................. 29/890.044 |
| 5,794,398 | 8/1998 | Kaehler et al. .......................... 29/523 |
| 5,799,395 | 9/1998 | Nording et al. .................. 29/890.053 |
| 5,879,099 | 3/1999 | Thoms . |

FOREIGN PATENT DOCUMENTS

| | | |
|---|---|---|
| 3701895C1 | 3/1988 | Germany . |
| 3927896A1 | 2/1991 | Germany . |
| 55-141341 | 11/1980 | Japan ...................................... 29/523 |
| 6-142792 | 5/1994 | Japan ................................... 29/421.1 |
| 928912 | 6/1963 | United Kingdom . |

RIGID CONNECTION OF STRUCTURAL PARTS IN THE CASE OF A MOTOR VEHICLE AND METHOD FOR ESTABLISHING THE CONNECTION

This application is a division of application Ser. No. 08/758,936, filed Dec. 3, 1996, now U.S. Pat. No. 5,879,099.

BACKGROUND AND SUMMARY OF THE INVENTION

This invention relates to a rigid connection of structural parts and a tool and a method for establishing the connection, in an arrangement with a first hollow tubular member structural part and a second structural part surrounding the first structural part and utilizing a high internal pressure forming technique.

A connection of this type and a tool of this type are know from German Patent Document DE 39 27 896 A1. A connection and a tool are described there for the positionally accurate fastening of cams on a hollow shaft. In the machining position, the cams and the hollow shaft which is guided through their threading opening are placed in a corresponding, negative-shape engraving of a forming tool divided into halves or quarters. An oblong, elastically deformable container, which is open on one side and into which a pressure fluid is filled, is introduced into the hollow shaft in a pressurized manner. In the area of one end of the hollow shaft, the container is supported on a bearing of the tool and, on the other end, it is supported in a fluid-tight and pressure-tight manner to a mouthpiece of a hydraulic system. The mouthpiece rests against the deforming tool and in the process supports the hollow shaft on this end. The mouthpiece, which is constructed as a pressure introducing body, has pressure intensifier piston by means of which the hydraulic system by way of a pressure duct provided in the mouthpiece and leading into the container exercises a high pressure on the pressure fluid, whereby the elastically deformable container expands and is placed against the interior side of the hollow shaft. By means of a further pressure rise, the hydraulic pressure is transmitted by way of the container to the hollow shaft which, as a result, is radially expanded along its whole length so that, because of the circumferential enlargement, the cams are provided with a press fit on the hollow shaft. However, for establishing the connection when the vehicle body parts are already coated during the assembly, the tool designed for this purpose is completely unsuitable because of the high-expenditure insertion of the structural parts into the tool, the multi-part construction of the tool which requires a plurality of operating steps, and the very high space requirement of the tool. Because of the high demands on the uniformity of the expansion of the hollow shaft—therefore, of the interior structural part—whose surface quality must be very high with a view to a sufficient concentricity, for establishing of the connection, a complete encapsulation of the structural parts to be connected is required by means of the known tool which is not possible in the case of vehicle body parts by means of acceptable expenditures.

Furthermore, it is known from German Patent Document DE 30 08 840 C2 to manufacture a tube frame construction of a motor vehicle by means of point welding, seam welding, folding or gluing of metal half shells.

In vehicle body construction, the sheet metal parts are generally connected with one another at their joining points in the body in white by means of resistance welding, as known, for example, from German Patent Document DE 33 06 397. As an alternative thereof, mechanical connections, such as penetration joining is used, as illustrated in a representative manner by German Patent Document DE 37 01 895. In this case, for avoiding corrosion in the customer operation, the vehicle body parts are subjected to an anticorrosion coating after the establishment of the connection. However, in order to join vehicle body parts during the assembly which are ready to be installed and therefore achieve a customer-friendly formation of variants in the final assembly which takes into account individual wishes, joining processes, such as welding and penetration joining cannon be used because in this case, the coating would be destroyed at the joining points and the visible side of the vehicle body parts would be visually impaired because of indentations, distortions of material and discolorations.

It is an object of the invention to further develop a connection of the above-mentioned type and a tool and method for establishing the connection such that the structural parts as vehicle body parts can also be joined after a coating during the assembly in a simple manner and can be effectively fixed to one another without any plastic deformation of the exterior structural part and without damage to the coating and thus without a visual impairment of the visible side of the structural parts.

According to the invention, this object is achieved by providing an assembly of structural parts for a motor vehicle comprising a first hollow part, and a second hollow part surrounding and fixedly connected to the first hollow part by internal high pressure expansion of the first hollow part, said first hollow part including inwardly protruding projections which form a releasable plug in connection with the second hollow part during a preassembly operation before internal high pressure expansion of the first hollow part, and said first hollow part being configured to plastically deform in response to internal high pressure to form a permanent connection with the second hollow part with substantially no plastic deformation of the first hollow part.

According to the invention, it is permitted that, during the assembly of the structural parts, because of the construction of the exterior second structural part with reduced cross-sections, a tentatively releasable connection between the structural parts is obtained by a simple fitting of the structural parts into one another, in the case of which releasable connection a given adjusted position of the structural parts with respect to one another is temporarily secured. The interior first structural part is supported on the cross-sectional reduction sections while, in the course between the sections, it forms an expansion space with the surrounding exterior structural part into which it can be plastically deformed when high pressure is introduced by way of a fluid. By means of the therefore achieved form-fitting between the structural parts, the previously releasable plug-type connection will become unreleasably rigid. Because of the fact that the fluid is held in a flexible hollow body introduced into the interior structural part and a dry deforming of the interior structural part is achieved. As a result of the different deforming capacities of the structural parts which are caused by different materials and/or different wall thicknesses of the structural parts, the interior structural part which, because of the significantly lower yield tension, is easier to deform than the exterior structural part, can be plastically deformed under high fluid pressure, whereas the exterior structural part remains undeformed or is deformed no more than elastically. Thus, the deforming is concentrated only on the interior structural part so that the exterior structural part, particularly its visible side, is not deformed and therefore has no unattractive bulges. Likewise, in this case, a shipping of the coating is avoided, for example, of the paint coat or of the corrosion protection.

The tool used for the fixing of the two structural parts to one another which is virtually constructed as a bending-elastic, radially flexible, hollow rod, can be inserted into any bending shapes of structural parts under a fluid pressure which is exercised on the inside and which is above the atmospheric pressure. In this case the tool adapts to the course of the interior of the interior first structural part because of its fluidically generated bending elasticity. In this case, the introduced tool can be pushed in a variable manner more or less far into the interior structural part, depending on at which point an expansion space of the exterior structural part is situated. In order to essentially prevent an axial lengthening of the tool when the fluid pressure is applied, which axial lengthening, on the one hand, results in a disturbance of the radial expansion of the interior structural part an, on the other hand, results in a considerable danger of tearing the skin of the rod-like swelling body, tension devices are provided which counteract in the axial direction. The swelling body is closed on all sides in a pressure-tight manner and completely closes the interior structural part on its ends so that, when a high fluid pressure is applied, no bubble of the elastic swelling body is formed which pushes between the interior and the exterior structural part and which may burst, whereupon a rapid pressure drop will occur in the high-pressure fluid.

The deforming takes place by means of very low equipment expenditures because an exterior support for the structural part situated on the outside as well as the press bedplate and the press slide customary in generally known internal high-pressure deforming arrangements are completely eliminated. The need for such parts is eliminated by the special construction of the invention and the material characteristics of the exterior structural part, on the one hand, and the largely free deformability of the interior structural part, that is, the absence of increased demands with respect to the surface quality and the course of the interior structural part, on the other hand. At the same time, the tool for the internal high-pressure deforming is not fixed stationarily but can be handled manually or possibly by means of an assembly robot in a locally independent manner.

By means of the possibility acquired by means of the connection according to the invention of incorporating, shortly before the finishing of the vehicle by means of finished and coated structural parts still changes into the body of the motor vehicle, the most varied model variants can be constructed on a short-term basis and in a rapid manner without any losses of quality according to customers' wishes.

Other objects, advantages and novel features of the present invention will become apparent from the following detailed description of the invention when considered in conjunction with the accompanying drawings.

DETAILED DESCRIPTION OF THE DRAWINGS

Figure 1:
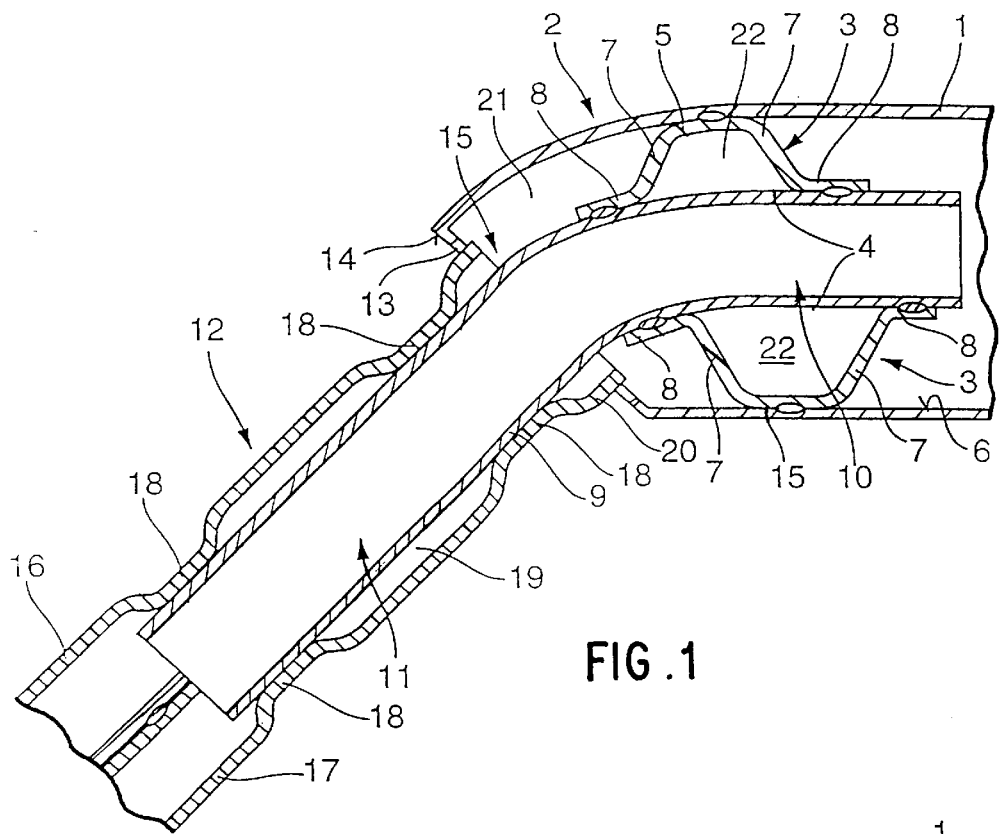
FIG. 1 is a lateral longitudinal sectional view of a connection according to the invention between two vehicle body parts showing the body parts in positions corresponding to a releasably adjustable plug-in position and without any expansion of the interior structural part.

FIG. 1 illustrates a section of a roof 1 of a motor vehicle which forms one of the vehicle body parts to be joined and which has a hollow construction at least in its forward end area 2 and there, on the interior side, has two opposite, U-shaped reinforcing profiles 3 which extend transversely toward the roof 1. The reinforcing profiles 3 are arranged so that they are aligned with respect to one another by means of their opening 4 and, on the base 5, are welded on the top and the bottom to the interior side 6 of the roof 1 which is coated in a corrosion-proof manner. As an alternative, a glued connection is also contemplated.

On their legs 7, the reinforcing profiles 3 each have flange strips 8 between which a tube-shaped first structural part 9 is fitted which, at its contact points with the strips 8 is welded to them. Instead of a welded connection, a glued connection is also contemplated according to other preferred embodiments. For the structural part, 9, the welded connection with the reinforcing profiles 3 and thus the rigid connection with the roof 1 signifies a tension rod in the axial direction for the later high-pressure action upon and the expansion of the structural part 9, which tension rod largely prevents an axial contraction of the structural part 9 during its radial expansion taking place at points as described below. The tube-shaped structural part 9 has a bend construction, in which case it is composed of a horizontally situated, linear section 10 and a section 11 which bends in the downward and forward direction at an obtuse angle.

A second hollow longitudinal structural part 12, which represents the A-column of the vehicle body is coated in a corrosion-proof manner, is fitted onto section 11 to such an extent that it projects slightly into an opening 13 on the forward face 14 of the roof 1. In the connection area 15 to the roof 1, the second structural part 12 has on the top and the bottom side two axially spaced reductions of the cross-section which are designed as contractions 18 of the linear course of the structural part 12 and by means of which the second structural part 12 is held on the interior side on the first structural part 9 in a frictionally engaged manner in the releasable plug-type connection. By means of the frictionally engaged plug-type connection, a secure mounting of the structural parts 9, 12 on the roof 1 is ensured which prevents a slipping of the structural parts 9, 12 which are coordinated with on another accurately to size in the relative position.

Because of the indirect connection between the roof 1 and the structural part 12 forming the A-column, in the case of which the structural part 9 is not fastened directly to the roof 1 but to the reinforcing profiles 3, a transmission of structure-borne noise from one body part to the other is prevented so that, with respect to noise, the connection has an advantageous effect on the overall vehicle body construction. Furthermore, also different materials can be used in the case for the joined vehicle body parts which previously had not been considered because of the otherwise occurring contact corrosion. This use can have a favorable effect on the light-weight construction of the vehicle body. It is also contemplated by the invention to mount the structural part 9 directly on the roof 1; however, the physical and chemical compatibility of the materials of both parts would then have to be ensured. Furthermore, because of the indirect connection of the vehicle body parts, manufacturing tolerances can be compensated without an deformation of the connected vehicle body parts so that the maintaining of a close dimensional tolerances for the motor vehicle is facilitated.

The structural part 12 is manufactured of two half-shells 16, 17, in which case this structural part 12 can be slid as a prefabricated welded-together constructional unit onto the structural part 9. The half shells 16 17 can also be placed separately on the structural part 9 and then subsequently be welded together. This avoids an inconvenient sliding of the structural part 12 onto the structural part 9, particularly if their end cross-sections have almost the same size.

Structural part 9 has a significantly lower yield tension than the surrounding structural part 12 and can therefore be plastically deformed much more easily. Optionally, the wall thickness of structural part 9 may also be smaller then that of structural part 12. In addition, the material of structural part 9 may be softer than that of structural part 12 so that, as a result, the deformability of structural part 9 with respect to structural part 12 is increased. The same applies in a comparison of structural part 9 with the reinforcing profiles 3. As a result, it is prevented that, in the case of a later expansion of the structural part 9, structural part 12 is also plastically deformed. By the use of half shells 16, 17 in the case of structural part 12 and their placing against structural part 9 and the subsequent welding-together of the shells, an undesirable deformation of structural part 9, which in comparison to structural part 12 consists of a very strongly and easily deformable material, is prevented.

Between the two plug-type connection points formed as contractions 18 of the structural part 12, structural part 12 together with structural part 9 bounds and expansion space 19. Furthermore, structural part 9, together with the end 20 of structural part 12 which adjoins the upper pug-type connection points toward the roof 1. Structural part 9 projects radially with respect to the contraction 18 as well as with the interior side 5 of the roof 1 and bounds an expansion space 21. Structural part 9 also bounds an expansion space 22 together with the reinforcing profiles 3 between their flange strips 8 facing away from one another. The two vehicle body parts to be connected—the roof 1 and the exterior second structural part 12—may already be painted before achieving the rigid connection. Instead of or together with the cross-sectional reductions 18 arranged on the top and the bottom on the structural part, cross-sectional reductions may also be provided laterally on it—possibly also in the shape of contractions.

Figure 2:
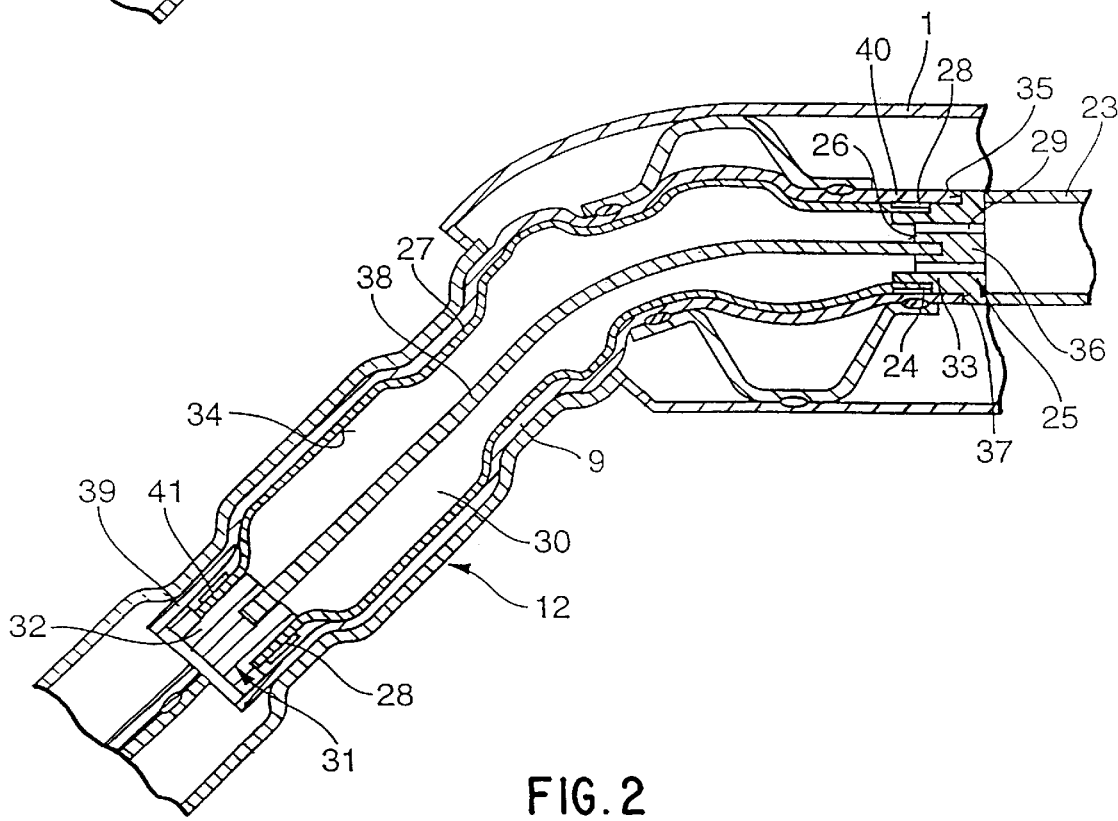
FIG. 2 is a lateral longitudinal sectional view of the connection of FIG. 1 with an internally high-pressure-expanded interior structural part and deforming tool according to the invention used for establishing the connection

FIG. 2 shows the joined vehicle body parts 1 and 12 in a rigid connection with one another. For establishing the rigid connection, a tool is slid through a through-grip opening which is arranged in the forward end area 2 of the roof but is situated farther in the rear with respect to the reinforcing profiles 3. The tool, which operates by means of the internal high-pressure deforming technique, contains a high-pressure fluid line 23 which is connected with a hydraulic system and a correspondingly suitable operating unit. Furthermore, a handle for an improved handling is provided on the tool.

On one end of the line 23, a plug 25 is fastened on which, on the side 26 facing away from the line, by means of one end 24, a swelling body 27, which is constructed as an elastomer hose piece, is fastened by means of, for example, a tensile metal band 28, the plug 25 closing the swelling body 27 in a pressure-tight manner. The hose piece has a wall thickness of approximately 1–3 mm. As an alternative, the swelling body 27 can be constructed as a bending-slack, rubber-like flexible skin cover.

The plug 25 has a longitudinal bore 29 which leads from the interior 30 of the swelling body 27 into the fluid line 23 to the outside and thus forms the pressure connection. On the other end 41, the swelling body 27 is closed in a pressure-tight manner by means of another plug 31 and is also fastened to it by means of a metal band 28. Both plugs 25 and 31 have a mushroom-shaped construction, in which case, the plug 31 by means of its head 32 fills in the cross-section of the tube-shaped structural part 9 in the area of the plug-type connection point but outside the area of the structural part 9 to be deformed so that the swelling body 27 cannot emerge as a bubble from the end 39 of the structural part 9 facing away from the roof. If the hose has a large wall thickness (3 mm), it is not necessary that the plug 31 completely fills in the cross-section of the structural part 9 because the hose, as the result of its thickness, cannot swell through the gap between the structural part 9 and the plug 31.

The swelling body 27 is now acted upon by way of the fluid line 23 and the longitudinal bore 29 with a fluid pressure in the interior which changes the swelling body 27 into a bending-elastic condition so that, during the introduction into the structural part 9, it can follow its bending course. When the tool has reached its predetermined position, the plug 25, by means of its shaft 33, in the proximity of the head, rests tightly against the interior side 34 of the structural part 9 and by means of the underside 35 of its head 36, rests closely on its face 37. This excludes a possible emerging of the swelling body 27 from the structural part 9 also at the end 40 facing the roof.

In order to avoid an axial lengthening of the swell body 27 during the expansion operation, a steel core 38 is provided for it as the tension device counteracting the lengthening, which steel core 38 extends within the interior 30 of the swelling body and connects both plugs 25 and 31 to which it is fastened.

Then the fluid pressure is raised, in which case the swelling body 27 expands radially and is placed tightly against the interior side 34 of the structural part 9. When the pressure is increased further, the material of the structural part 9, between the plug-type connection points, between the weld connections points of the reinforcing profiles 3, and between the upper plug-type connection point and the weld connection point adjoining it, is pressed because of the pressure-transmitting swelling body 27, into the expansion spaces 19, 21 and 22 until a form-closure of the structural part 9 is obtained with the structural part 12 and the reinforcing profiles 3, which causes a locking of the parts. Since the guiding of the pressure takes place in a closed tool system, the tool operates completely without recoil so that, also at high pressures, a simple manual handling is ensured. The introduction of pressure can take place in superimposed pressure surges of a duration which is in the millisecond range.

In this case, the course of the wall of the structural part 9 can adapt to the interior contour of the structural part 12—as shown—or the wall of the structural part 9 can be placed against the wall of structural part 12. As a result, no space is left in which moisture, such as perspiration water, can collect which may lead to a corrosion on the uncoated interior side of the structural part 12 and of the structural part 9 over time. Furthermore, no airborne sound waves can form which with respect to noise would be disadvantageous for the vehicle body.

After the establishment of the rigid connection, the fluid pressure is reduced until the swelling body 27 which is extremely hard under high pressure is sufficiently bending elastic and is then pulled out of the structural part 9. Therefore hollow vehicle body parts of all conceivable geometrical shapes can be connected with one another in a simple manner by means of the connection technique according to the invention. The material thicknesses of the structural parts 9, 12, the dimensions of the expansion spaces 19, 21, 22, the consistency of the materials of the structural parts 9, 12 to be joined and the pressure intensity must be mutually coordinated empirically so that the exterior structural member 12 remains undeformed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of connecting a first hollow part to a second hollow part surrounding at least a portion of the first hollow part, said method comprising:

forming the second hollow part with a constant thickness and with at least two radially inwardly facing protrusions form at least two reduced diameter portions, inserting the first hollow part into the second hollow part with said protrusions forming an adjustable releasable plug-in frictional connection of the first and second parts, subsequently inserting a fluid expandable tool into the first hollow part and applying fluid pressure to said tool to effect radial expansion plastic deformation of the first hollow part to thereby form a fixed connection of the first and second hollow parts at and between the protrusions and then removing the fluid expandable tool.

2. A method according to claim 1, wherein said first and second hollow parts are automobile parts.

3. A method according to claim 2, wherein one of said parts is a vehicle A-frame member and the other part is a part fixedly connected with a vehicle roof member.

* * * * *